Patented Apr. 7, 1953

2,634,255

UNITED STATES PATENT OFFICE 2,634,255

CRAZE-RESISTANT ADHESIVE HAVING IMPROVED STORAGE STABILITY

Donald G. Patterson, Darien, Conn., assignor to American Cyanamid Company, New York, N. Y., a corporation of Maine No Drawing. Application September 23, 1949, Serial No. 117,504

5 Claims. (Cl. 260—70)

This invention relates to a process of stabilizing adhesive compositions against premature gelation. More particularly, this invention relates to a process of stabilizing a furfuryl alcohol modified urea-formaldehyde condensation product by heating said modified urea-formaldehyde composition with methanol and/or ethyl. More particularly, this invention relates to the stabilization of furfuryl alcohol modified urea-formaldehyde condensation products by the addition of 5%–15% of ethanol or methanol and heating the mixture to reflux temperature for a comparatively short period of time.

The object of the present invention is to increase the useful life of furfuryl alcohol modified urea-formaldehyde condensation products in their use as adhesive materials by heating said condensation products in the presence of methanol or ethanol. A further object of the present invention is to improve the storage stability of these resinous compositions in order that they may be packaged in containers suitable for use by consumers, whose requirements are not necessarily substantial or immediate. A still further object of the present invention is to improve the stability of these adhesive materials in order that they may be stored for prolonged periods of time while still maintaining their effectiveness as adhesives and gap-filling cements without undergoing premature gelation while exposed to normal conditions of temperature. These and other objects of the instant invention will be set forth in greater detail hereinbelow.

The urea-formaldehyde condensation products which may be stabilized by the addition of methanol or ethanol are those which have been modified by a furane derivative such as furfuryl alcohol or furfural. Attention is directed to the copending application of William G. Simons, filed April 18, 1945, bearing Serial No. 589,103, now Patent No. 2,518,388 in which the claims are directed to adhesive materials comprising a urea-formaldehyde resin product having a mol ratio of 1:1 to 1:2 and furfuryl alcohol wherein the weight ratio of the furfuryl alcohol to the urea-formaldehyde resin is 0.05:1 to 0.5:1, respectively, and Simons' continuation-in-part application filed January 7, 1947 bearing the Serial No. 720,693 now abandoned but refiled as Simons' continuation in part application filed October 21, 1949, bearing the Serial No. 122,871 and claiming an adhesive comprising a urea-formaldehyde resin and furfural in which the mol ratios and weight ratios are similar to those set forth in the earlier application.

The adhesives prepared by blending furfuryl alcohol and urea-formaldehyde resins in the proportions stated are useful as hot or cold setting adhesives, as gap-filling cements in thin or thick glue lines.

These adhesive materials prepared in keeping with the disclosures of Simons are resistant to cracking, resistant to the deleterious effects of water, display desirable viscosities, exhibit good bonding characteristics regardless of pressure temperature or thickness of the glue lines and show pronounced improvement in dimensional stability. These resinous adhesives, furthermore, have good stability, that is, they display storage stability of from 14–22 months under normal conditions of temperature and pressure. Although this storage stability is good by all standards, it is desired to improve this stability by the practice the process of the instant invention. The products of the instant invention have an increased useful life which is at least 2–3 times that displayed by the furfuryl alcohol-urea-formaldehyde adhesives not treated in accordance with the process of the instant invention.

The following example will serve to illustrate the invention in greater detail. This example is by way of illustration only and is not to be interpreted as a limitation on the case except as indicated in the appended claims. All parts are parts by weight.

EXAMPLE 1

90 parts of a urea-formaldehyde resin modified by furfuryl alcohol (mol ratio of urea to formaldehyde 1:1.7-weight ratio of urea-formaldehyde resin to furfuryl alcohol 1:0.4) and 10 parts of methanol are introduced into a suitable reaction chamber and are heated to about 88° C. and held at this temperature (reflux) for about 15 minutes. The mixture is then cooled to room temperature.

This adhesive shows improved storage stability over the untreated furfuryl alcohol modified urea-formaldehyde resin as indicated hereinbelow:

| Resin | Liquid Life at 130° F.,[1] Weeks |
|---|---|
| Furfuryl Alcohol Modified Urea-Formaldehyde | 5 |
| Furfuryl Alcohol Modified Urea-Formaldehyde+ 10% Methanol | 16 |

[1] Before gelation.

EXAMPLE 2

90 parts of a furfuryl alcohol modified urea-formaldehyde resin (mol ratio of urea to formaldehyde 1:2-weight ratio urea-formaldehyde resin to furfuryl alcohol 1:0.4) and 10 parts of ethanol are introduced into a suitable reaction chamber and heated to reflux temperature for about 15 minutes. The mixture is then allowed to cool to room temperature. This adhesive composition shows improved storage stability over the unmodified furfuryl alcohol urea-formaldehyde resin as indicated hereinbelow:

| Resin | Liquid Life at 130° F.,[1] Weeks |
|---|---|
| Furfuryl Alcohol Modified Urea-Formaldehyde | 5 |
| Furfuryl Alcohol Modified Urea-Formaldehyde+ 10% Ethanol | 12 |

[1] Before gelation.

The furfuryl alcohol modified urea-formaldehyde resin and modified in accordance with the process set forth in Examples 1 and 2 may be prepared for use as an adhesive by the addition of 10 to 20 parts of the following hardener per 100 parts of the liquid resin:

90 parts wood flour
20 parts ammonium chloride
1 part of tricalcium phosphate

The urea resin used in the preparation of the potential adhesive materials is preferably one in which the mol ratio of urea to formaldehyde is 1:1.7. However, mol ratios may be used such as 1:1 to 1:2 of urea to formaldehyde, respectively. In the preparation of the furfuryl alcohol or furfural modified urea resin, one may prepare formulations containing in parts by weight from about 0.05 to 0.5 of a compound containing the furane ring structure (furfuryl alcohol or furfural) per part of urea resin. Best results are realized, however, when the ratio in parts by weight of the urea-formaldehyde resin to furfuryl alcohol or furfural is 1:0.4, respectively. The following example will serve to illustrate the method of preparation of the furfuryl alcohol or furfural modified urea-formaldehyde resin adhesive.

Resin A

A kettle is charged with the following materials:

286 parts of urea-formaldehyde resin solution-mol ratio 1:1.9 (70% solids)
80 parts of furfuryl alcohol
1.1 parts of triethanolamine The above materials, having a pH of about 8, are slowly heated to about 90° C. during a period of about ½ hour. The temperature is held at 90° C. for about 15 minutes and then cooled to about 30° C. during a period of about 80 minutes. The cooled product is then discharged from the kettle.

Resin B

A suitable method of preparing an adhesive resin is to charge into a kettle, 1430 parts of a urea-formaldehyde resin syrup, preferably having a molar ratio of 1.7:2.5 mols of formaldehyde per mol of urea, 400 parts of furfuryl alcohol, and 5 parts of triethanolamine. The materials were heated slowly under alkaline conditions, with agitation, up to 70° C. during a period of ½ hour, and thereafter cooled to about 30° C.

The use of a liquid resin is not necessary in the preparation of a suitable adhesive for the solid resin may be used equally as well. It is necessary, however, to provide sufficient water to the solid resin to effect an adhesive syrup. By like token, it is not necessary to effect reaction at elevated temperature between the urea-formaldehyde resin and the furane derivative, but when the materials are subjected to such a heat-treatment, the stability of the resultant composition is improved.

Resin C

The following materials were charged to a suitable reaction vessel, and agitated until a homogeneous mixture was obtained. One hundred parts of a spray dried urea-formaldehyde resin having a molar ratio of 1.7 mols of formaldehyde per mol of urea; 40 parts of water; and 29 parts of furfural.

Other urea-aldehyde condensation products may be used in effecting the furane derivative modified resin, and other procedures may be employed. Several examples are adequately described in the copending applications of William G. Simons, filed April 18, 1945, and January 7, 1947, and bearing the Serial Nos. 589,103, now Patent No. 2,518,388 and 720,693, respectively.

The furfuryl alcohol modified urea-formaldehyde resin thus prepared is in suitable condition for use in the process of the instant invention in the manner set forth hereinabove in Example 1 or Example 2. As a modification of the process of the instant invention, it is possible to heat the urea-formaldehyde resin in the presence of the furfuryl alcohol or the furfural and methanol or ethanol in a one heating step, thereby accomplishing some considerable economy in the operation. It is not imperative that the mixture of the lower aliphatic alcohols and the furane ring compound modified urea-formaldehyde resin mixture be heated at reflux temperatures, any lower temperature may be utilized but the use of lower temperatures, even room temperatures, necessitates the extension of the heating period. It is actually desirable from the economic standpoint to heat the mixture at reflux for relatively short periods of time such as 15–30 minutes and no harmful effect is produced even if the heating is extended at reflux for periods up to about an hour. Beyond the one hour period the stabilizaton of the adhesive mix begins to diminish and the economics of the operation make it undesirable in other respects. In the practice of the process of the instant invention, it is possible to use varying quantities of methanol and/or ethanol in the stabilization of the adhesive syrups such as by the use of 5%–15% of the alcohol based on the total weight of the stablized resinous composition. It is actually preferred, however, to use about 10% of alcohol as a practical maximum. The use of the alcohol in amounts less than 5% give diminished stability effects while maintaining excellent strength development. On the other hand, the use of more than 15% of alcohol gives better stability but diminished strength development in the adhesive.

For some applications, it may be desired to make use of fillers or extenders in the preparation of the adhesive syrup. These fillers or extenders, when used, should preferably be inert, insoluble, and non-swelling when treated with water. The amount of filler used may vary, but in keeping with the superior adhesive characteristics of the untreated furfuryl alcohol or furfural modified urea-formaldehyde resin, it is preferred to use not more than about 20 parts by weight of filler based on the weight of the dry resin. Wood flour is one of the preferred inert fillers which may be used because it has a sponging effect and tends to keep the adhesive at the glue line.

As a hardening catalyst in the formulation of the adhesive material prior to use, one may add an acid or an acid yielding compound which catalyzes the hardening of the adhesive at a desired rate. Generally, a catalyst may be used in quantities varying between 0.005 part to 0.2 part by weight per part of resin. These catalysts include such compounds as ammonium sulfate, ammonium phosphate, ammonium acid phosphate, ammonium acid sulfate and the like. These catalysts will produce a gradual liberation of acidity. It is generally preferred to add a buffering material such as calcium phosphate in order to control the rate of liberation of the acidity in the catalyst. The buffer may be added either during the process of preparation of the resin syrup or just prior to the addition of the hardening catalyst.

I claim:

1. A process for stabilizing an adhesive composition comprising heating a mixture of a urea-formaldehyde resin having a mol ratio of 1:1 to 1:2, respectively, a compound containing a furane ring structure selected from the group consisting of furfuryl alcohol and furfural, wherein the furane ring compound and urea-formaldehyde resin are present in a weight ratio of 0.05:1 to 0.5:1, respectively, and 5 to 15% by weight of an alcohol selected from the group consisting of methanol and ethanol wherein said percentages by weight are based on the total weight of the composition.

2. A process for stabilizing an adhesive composition comprising heating at reflux temperatures a mixture of a urea-formaldehyde resin having a mol ratio of 1:1 to 1:2, respectively, a compound containing a furane ring structure selected from the group consisting of furfuryl alcohol and furfural, wherein the furane ring compound and urea-formaldehyde resin are present in a weight ratio of 0.05:1 to 0.5:1, respectively, and 5 to 15% by weight of an alcohol selected from the group consisting of methanol and ethanol wherein said percentages by weight are based on the total weight of the composition.

3. A process for stabilizing an adhesive composition comprising heating at reflux temperature a mixture of a urea-formaldehyde resin having a mol ratio of 1:1.7, respectively, a compound containing a furane ring structure selected from the group consisting of furfuryl alcohol and furfural wherein the furane ring compound and urea-formaldehyde resin are present in a weight ratio of 1:0.4, respectively, and 10% by weight of an alcohol selected from the group consisting of methanol and ethanol wherein said percentages by weight are based on the total weight of the composition.

4. A stabilized composition of matter comprising a reaction mixture of a urea-formaldehyde resin having a mol ratio of 1:1 to 1:2, respectively, a furane ring compound selected from the group consisting of furfuryl alcohol and furfural, said furane ring compound being present in a weight ratio with respect to the urea-formaldehyde resin of 0.05:1 to 0.5:1, respectively, and an alcohol selected from the group consisting of methanol and ethanol, wherein said alcohol is present in an amount equaling 5%–15% by weight based on the total weight of the composition.

5. A stabilized composition of matter comprising a reaction mixture of a urea-formaldehyde resin having a mol ratio of 1:1.7, respectively, a furane ring compound selected from the group consisting of furfuryl alcohol and furfural, said furane ring compound being present in a weight ratio with respect to the urea-formaldehyde resin of 0.4:1, respectively and an alcohol selected from the group consisting of methanol and ethanol, wherein said alcohol is present in an amount equaling 10% by weight based on the total weight of the composition.

DONALD G. PATTERSON.

REFERENCES CITED

The following references are of record in the file of this patent:

UNITED STATES PATENTS

| Number | Name | Date |
| --- | --- | --- |
| 2,300,208 | D'Alelio | Oct. 27, 1942 |
| 2,335,701 | Root | Nov. 30, 1943 |

FOREIGN PATENTS

| Number | Country | Date |
| --- | --- | --- |
| 626,645 | Great Britain | July 19, 1949 |